US009053036B2

(12) United States Patent
Jain et al.

(10) Patent No.: US 9,053,036 B2
(45) Date of Patent: Jun. 9, 2015

(54) SYSTEM AND METHOD FOR PROVIDING A FLASH MEMORY CACHE INPUT/OUTPUT THROTTLING MECHANISM BASED UPON TEMPERATURE PARAMETERS FOR PROMOTING IMPROVED FLASH LIFE

(71) Applicant: LSI Corporation, San Jose, CA (US)

(72) Inventors: Ashish Jain, Bangalore Karnataka (IN); Kiran B. Dalvi, Maharashtra (IN); Amit K. Sharma, Karnataka (IN)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 325 days.

(21) Appl. No.: 13/684,838

(22) Filed: Nov. 26, 2012

(65) Prior Publication Data

US 2014/0149638 A1    May 29, 2014

(51) Int. Cl.
*G06F 12/08* (2006.01)
*G06F 11/00* (2006.01)
*G06F 13/16* (2006.01)
*G06F 12/02* (2006.01)

(52) U.S. Cl.
CPC .......... *G06F 12/0888* (2013.01); *G06F 11/002* (2013.01); *G06F 13/1673* (2013.01); *G06F 12/0246* (2013.01); *G06F 12/0866* (2013.01); *G06F 2212/1036* (2013.01); *G06F 2212/222* (2013.01)

(58) Field of Classification Search
None
See application file for complete search history.

(56) References Cited

U.S. PATENT DOCUMENTS 5,598,395 A * 1/1997 Watanabe .................. 369/53.12

* cited by examiner

*Primary Examiner* — Midys Rojas
(74) *Attorney, Agent, or Firm* — Duft Bornsen & Fettig

(57) ABSTRACT

Aspects of the disclosure pertain to a system and method for providing a flash memory cache input/output throttling mechanism based upon temperature parameters for promoting improved flash life. The mechanism restricts flash memory cache caching of inputs/outputs associated with Least Recently Used data and Most Recently Used data when a temperature of the flash memory is at or above a threshold temperature.

20 Claims, 2 Drawing Sheets

SYSTEM AND METHOD FOR PROVIDING A FLASH MEMORY CACHE INPUT/OUTPUT THROTTLING MECHANISM BASED UPON TEMPERATURE PARAMETERS FOR PROMOTING IMPROVED FLASH LIFE

BACKGROUND

Solid-state flash memory is used as secondary caching storage in a number of systems. However, solid-state flash memory used for this purpose sometimes experiences issues with performance and endurance.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner Aspects of the disclosure pertain to a system and method for providing a flash memory cache input/output throttling mechanism based upon temperature parameters for promoting improved flash life.

BRIEF DESCRIPTION OF THE DRAWINGS

The detailed description is described with reference to the accompanying figures.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be facilitated by methods, devices, and/or embodied in articles of commerce. The following detailed description is, therefore, not to be taken in a limiting sense.

Solid-state flash memory is used as secondary caching storage in a number of systems. However, solid-state flash memory used for this purpose sometimes experiences issues with performance and endurance.

As more fully set forth below, aspects of the disclosure include a system and method for providing a flash memory cache input/output throttling mechanism based upon temperature parameters for promoting improved flash life.

Figure 1:
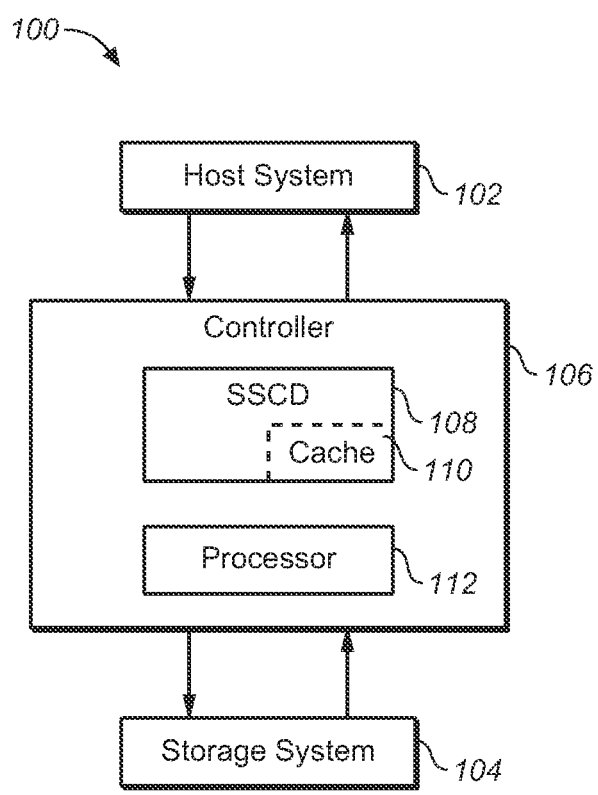
FIG. 1 is an example conceptual block diagram schematic of a data handling system.

As indicated in FIG. 1 (FIG. 1), a system (e.g., a data handling system) 100 is shown. For example, the system 100 is, includes and/or is implemented with or as part of an external direct-attached storage (DAS) system, an internal DAS system, a Redundant Array of Independent Disks (RAID) system, software systems, enclosures, network-attached storage (NAS) systems and networks, storage area network (SAN) systems and networks. In embodiments, the system 100 includes a host system 102. For example, the host system 102 is a computer on a network which provides services to users or other computers on that network.

In embodiments, the system 100 includes a storage system 104. For example, the storage system includes computer components and recording media used to retain digital data. In embodiments, the storage system 104 includes a plurality of physical disk drives, such as hard disk drives and/or optical disk drives.

In embodiments, the system 100 includes a controller 106. The host system 102 is communicatively coupled with the storage system 104 via the controller 106. In embodiments, the controller 106 is a disk array controller. The disk array controller 106 is a device that manages physical disk drives of the storage system 104 and presents them as logical units. In embodiments, the controller (e.g., disk array controller) 106 implements hardware Redundant Array of Independent Disks (RAID) (e.g., is a RAID controller). In embodiments, the controller (e.g., disk array controller) 106 is a Serial Attached Small Computer System Interface (SAS) controller. For example, the controller 106 is a MegaRAID® SAS controller. In embodiments, the controller 106 is a RAID controller card.

In embodiments, the controller 106 includes memory 108. For example, memory includes physical device(s) used to store programs (e.g., sequences of instructions) or data (e.g., program state information) on a temporary or permanent basis for use in a computer or other digital electronic device. In embodiments, the memory 108 is semiconductor memory. For example, the semiconductor memory is an electronic data storage device implemented on a semiconductor-based integrated circuit. In embodiments, the memory 108 is non-volatile memory. For example, the non-volatile memory is computer memory that is: i.) configured for retaining stored information even when it's not powered; and ii.) configured for providing secondary storage, or long-term persistent storage. In embodiments, the memory 108 is flash memory. For example, the flash memory is a type of non-volatile memory, such as a non-volatile computer storage chip that is configured for being electrically erased and re-programmed. In embodiments, the memory 108 is solid-state flash memory. For example, the solid-state flash memory is configured for use as secondary caching storage in the controller 106. In embodiments, the memory 108 is a solid-state drive. For example, the solid-state drive is a data storage device that uses integrated circuit assemblies as memory to store data persistently.

In embodiments, the memory (e.g., solid-state drive) 108 includes a cache 110, the cache being a component configured for transparently storing data so that future requests for that data are served faster. For example, the cache 110 is a solid-state drive cache and/or a flash memory cache. In embodiments, the memory (e.g., solid-state drive) 108 including the cache 110 is a solid-state cache device (SSCD) (e.g., a solid-state drive cache device).

In embodiments, the controller 106 includes a processor 112. The processor 112 provides processing functionality for the system 100 and can include any number of processors, micro-controllers, or other processing systems and resident or external memory for storing data and other information accessed or generated by the system 100. The processor 112 can execute one or more software programs that implement techniques described herein. The processor 112 is not limited by the materials from which it is formed or the processing mechanisms employed therein and, as such, can be implemented via semiconductor(s) and/or transistors (e.g., using electronic integrated circuit (IC) components), and so forth. In embodiments, the controller 106 is implemented as hardware, firmware, software or a combination thereof. In embodiments, the controller 106 is implemented on a chip (e.g., is a RAID on chip (RoC) controller). In embodiments, the memory 108 is implemented on a same or different chip from the controller 106.

In embodiments, the memory (e.g., solid-state flash memory) 108 is configured for performing dynamic read and write caching of hot spot data for promoting reduced input/output (I/O) latency for the system 100. For example, hot spot data is data associated with a region of a computer program where a high proportion of executed instructions occur or where most time is spent during the program's execution. In embodiments, the system 100 is configured for selectively routing input(s)/output(s) (I/Os) (e.g., read requests, write requests, read data, write data) between the host 102 and the cache 110 of the solid-state flash memory 108. For example, the system 100 is configured for selectively caching I/Os in the cache 110 of the solid-state flash memory 108 based upon thermal parameters (e.g., a temperature quotient or temperature threshold) associated with the solid-state flash memory. In embodiments, when a current temperature of the solid-state flash memory (e.g., solid-state flash drive) 108 exceeds a certain temperature limit or threshold, caching of I/Os to/in the cache 110 of the solid-state flash memory is restricted or limited.

In embodiments, multiple threshold temperatures are defined (e.g., pre-established, pre-determined) for the solid-state flash memory 108. For example, two threshold temperatures, a first threshold temperature (e.g., lower threshold temperature) and a second threshold temperature (e.g., upper threshold temperature), are established for the solid-state flash memory 108, the second threshold temperature being a higher temperature than the first threshold temperature. When a current temperature of the solid-state flash memory 108 is below the first threshold temperature, the solid-state flash memory 108 is defined as being in a first (e.g., normal) stage. When a current temperature of the solid-state flash memory 108 is at or above the first threshold temperature and below the second threshold temperature, the solid-state flash memory 108 is defined as being in a second (e.g., warning) stage. When a current temperature of the solid-state flash memory 108 is at or above the second threshold temperature, the solid-state flash memory 108 is defined as being in a third (e.g., critical) stage.

As mentioned above, the system 100 is configured for selectively allowing I/Os to be cached in (e.g., routed to) the cache 110 of the solid-state flash memory 108 based upon thermal parameters associated with the solid-state flash memory 108. In embodiments, when the solid-state flash memory 108 is in the first (e.g., normal) stage, the system 100 is configured for allowing caching of I/Os in the cache 110 of the solid-state flash memory in an unrestricted manner. For example, I/Os associated with data ranging from Least Recently Used (LRU) data to Most Recently Used (MRU) data (e.g., all I/Os) are cached in the cache 110 of the solid-state flash memory 108. In embodiments, when the solid-state flash memory 108 is in the third (e.g., critical) stage, the system 100 is configured for completely restricting (e.g., stopping) the caching of I/Os in the cache 110 of the solid-state flash memory. For example, when the solid-state flash memory 108 is in the critical stage, caching of any I/Os in the cache 110 of the solid-state flash memory 108 is stopped. In embodiments, when the solid-state flash memory 108 is in the second (e.g., warning) stage, the system 100 is configured for partially restricting the caching of I/Os in the cache 110 of the solid-state flash memory. For example, I/Os associated with Least Recently Used (LRU) data (e.g., data associated with LRU Logical Block Addresses) and I/Os associated with Most Recently Used (MRU) data (e.g., data associated with MRU Logical Block Addresses) are restricted from being cached in the cache 110. For example, when the solid-state flash memory 108 is in the warning stage, write operations to the SSD cache device 108 are stopped for I/Os associated with data corresponding to the LRU regions and MRU regions. In embodiments, when the solid-state flash memory 108 is in the warning stage, LRU cache windows and MRU cache windows are flushed to a source volume (e.g., solid-state drive volume, Source Logical Drive) of the system 100 and middle path I/Os are serviced (e.g., cached).

In further embodiments, when the solid-state flash memory 108 is in the warning stage, the system 100 is configured for restricting the caching of I/Os in the cache 110 of the solid-state flash memory based upon rate criteria, such as read and write rates associated with the I/Os. Selective restriction of the caching of I/Os based upon rate criteria promotes improved utilization efficiency of the solid-state flash memory 108 to achieve a lower power profile. For example, in some embodiments, rather than restricting all I/Os associated with MRU data, some I/Os associated with some MRUs (e.g., some MRU data) are cached in the cache 110 of the solid-state flash memory 108 based upon rate criteria for promoting an improved hit rate.

In embodiments, the system 100 implements an algorithm for providing the above-described selective I/O caching functionality. By causing the system 100 to selectively cache the I/Os in the above-described manner, the algorithm promotes improved performance and endurance (e.g., lifespan) of the solid-state cache device (e.g., solid-state drive cache volume) 108. In embodiments, a routing table is implemented by the system 100 for selectively routing the I/Os to the solid-state flash memory 108 (e.g., for selectively caching the I/Os in the cache 110 of the solid-state flash memory 108). For example, the routing table contains Boolean values and based upon these Boolean values: i.) I/Os are selectively cached in the cache 110 of the solid-state flash memory 108; and/or ii.) MRU and LRU cache windows are flushed (e.g., reduced) from the solid-state flash memory 108 to the source volume.

Figure 2:
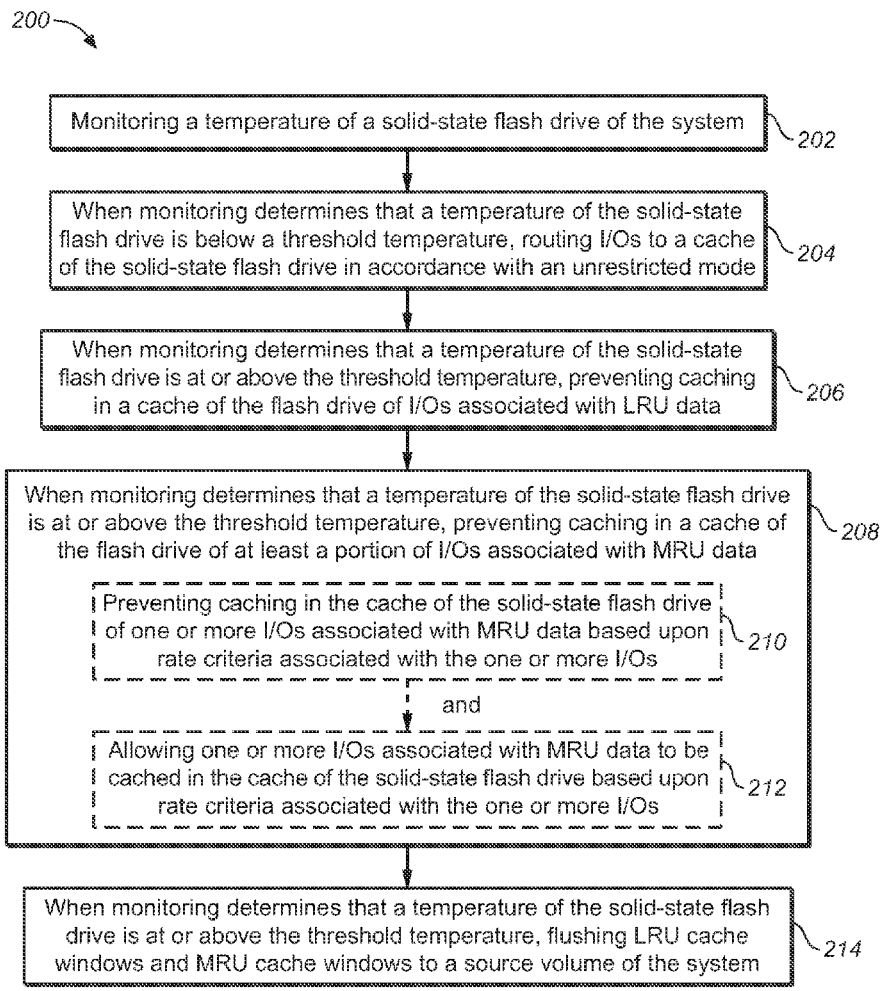
FIG. 2 is a flow chart illustrating a method for providing selective caching of input(s)/output(s) in a flash memory cache of the system shown in FIG. 1.

FIG. 2 is a flowchart illustrating a method for providing a flash memory cache input/output throttling mechanism for a data handling system (e.g., such as the system 100 shown in FIG. 1) based upon temperature parameters for promoting improved flash life. In embodiments, the method 200 includes the step of monitoring a temperature of a solid-state flash drive of the system 202. For example, the controller 106 of the system 100 is configured for monitoring the temperature of the solid-state flash drive 108. In embodiments, the method 200 further includes the step of, when monitoring determines that a temperature of the solid-state flash drive is below a threshold temperature, routing I/Os to a cache of the solid-state flash drive in accordance with an unrestricted mode 204. For example, when monitoring determines that a temperature of the solid-state flash drive 108 is below the threshold temperature (e.g., is in a normal state), the controller 104 is configured for routing any and/or all received I/Os (e.g., including I/Os associated with LRU data and I/Os associated with MRU data) to the cache 110 of the solid-state flash drive 108, such that the I/Os are cached in the cache 110.

In embodiments, the method 200 further includes the step of, when monitoring determines that a temperature of the solid-state flash drive is at or above the threshold temperature, preventing caching in a cache of the flash drive of I/Os associated with LRU data 206. For example, when monitoring determines that a temperature of the solid-state flash drive 108 is at or above the threshold temperature (e.g., is in a warning state), the controller 104 is configured for restricting (e.g., preventing) caching in the cache 110 of the flash drive 108 of I/Os associated with LRU data. In embodiments, the method 200 further includes the step of, when monitoring determines that a temperature of the solid-state flash drive is at or above the threshold temperature, preventing caching in a cache of the flash drive of at least a portion of I/Os associated with MRU data 208. For example, when monitoring determines that a temperature of the solid-state flash drive 108 is at or above the threshold temperature (e.g., is in a warning state), the controller 104 is configured for restricting (e.g., preventing) caching of at least some I/Os associated with MRU data. In some embodiments, the step of preventing caching of at least a portion of I/Os associated with MRU data 208, includes preventing caching in the cache 110 of the solid-state flash drive 108 of all I/Os associated with MRU data. In other embodiments, the step of preventing caching of at least a portion of I/Os associated with MRU data includes the sub-steps of: preventing caching in the cache of the solid-state flash drive of one or more I/Os associated with MRU data based upon rate criteria associated with the one or more I/Os 210; and allowing one or more I/Os associated with MRU data to be cached in the cache of the solid-state flash drive based upon rate criteria associated with the one or more I/Os 212. For example, during the warning state, the I/Os associated with MRU data are selectively cached in the cache 110 of the solid-state flash drive 108 based upon read and write rates associated with I/Os for promoting achievement of a lower power profile.

In embodiments, the method 200 further includes the step of, when monitoring determines that a temperature of the solid-state flash drive is at or above the threshold temperature, flushing LRU cache windows and MRU cache windows to a source volume of the system 214. For example, when monitoring determines that a temperature of the solid-state flash drive 108 is at or above the threshold temperature, the controller 104 is configured for causing LRU cache windows and MRU cache windows to be flushed (e.g., reduced) from the cache 110 of the solid-state flash drive to a source volume of the system 100.

It is to be noted that the foregoing described embodiments may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the embodiments described herein may be conveniently implemented in forms of a software package. Such a software package may be a computer program product which employs a non-transitory computer-readable storage medium including stored computer code which is used to program a computer to perform the disclosed functions and processes disclosed herein. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing an input/output throttling mechanism for a data handling system, the method comprising:
    monitoring a temperature of a solid-state flash drive of the system;
    when monitoring determines that the temperature of the solid-state flash drive is below a threshold temperature, routing inputs/outputs to an internal cache of the solid-state flash drive in accordance with an unrestricted mode;
    when monitoring determines that the temperature of the solid-state flash drive is at or above the threshold temperature, preventing caching in the cache of the flash drive of inputs/outputs associated with Least Recently Used data; and
    when monitoring determines that the temperature of the solid-state flash drive is at or above the threshold temperature, preventing caching in the cache of the flash drive of at least a portion of inputs/outputs associated with Most Recently Used data.

2. The method as claimed in claim 1, further comprising:
    caching middle path inputs/outputs in the cache while preventing caching of inputs/outputs associated with Least Recently Used data and
    caching middle path inputs/outputs in the cache while preventing caching of inputs/outputs associated with Most Recently Used data.

3. The method as claimed in claim 1, wherein the step of preventing caching of at least a portion of inputs/outputs associated with Most Recently Used data includes the step of:
    preventing caching in the cache of the solid-state flash drive of one or more inputs/outputs associated with Most Recently Used data based upon rate criteria associated with the one or more inputs/outputs.

4. The method as claimed in claim 1, further comprising:
    allowing one or more inputs/outputs associated with Most Recently Used data to be cached in the cache of the solid-state flash drive based upon rate criteria associated with the one or more inputs/outputs.

5. The method as claimed in claim 4, wherein the rate criteria includes read and write rates.

6. The method as claimed in claim 1, further comprising:
    when monitoring determines that the temperature of the solid-state flash drive is at or above the threshold temperature, flushing Least Recently Used cache windows and Most Recently Used cache windows to a source volume of the system.

7. A non-transitory computer-readable medium having computer-executable instructions for performing a method for providing an input/output throttling mechanism for a data handling system, the method comprising:
    monitoring a temperature of a solid-state flash drive of the system;
    when monitoring determines that the temperature of the solid-state flash drive is below a threshold temperature, routing inputs/outputs to an internal cache of the solid-state flash drive in accordance with an unrestricted mode;
    when monitoring determines that the temperature of the solid-state flash drive is at or above the threshold temperature, preventing caching in the cache of the flash drive of inputs/outputs associated with Least Recently Used data; and
    when monitoring determines that the temperature of the solid-state flash drive is at or above the threshold temperature, preventing caching in the cache of the flash drive of at least a portion of inputs/outputs associated with Most Recently Used data.

8. The non-transitory computer-readable medium as claimed in claim 7, further comprising:
caching middle path inputs/outputs in the cache while preventing caching of inputs/outputs associated with Least Recently Used data and
caching middle path inputs/outputs in the cache while preventing caching of inputs/outputs associated with Most Recently Used data.

9. The non-transitory computer-readable medium as claimed in claim 7, wherein the step of preventing caching of at least a portion of inputs/outputs associated with Most Recently Used data includes the step of:
preventing caching in the cache of the solid-state flash drive of one or more inputs/outputs associated with Most Recently Used data based upon rate criteria associated with the one or more inputs/outputs.

10. The non-transitory computer-readable medium as claimed in claim 7, the method further comprising:
allowing one or more inputs/outputs associated with Most Recently Used data to be cached in the cache of the solid-state flash drive based upon rate criteria associated with the one or more inputs/outputs.

11. The non-transitory computer-readable medium as claimed in claim 10, wherein the rate criteria includes one of: read rates and write rates.

12. The non-transitory computer-readable medium as claimed in claim 7, the method further comprising:
when monitoring determines that the temperature of the solid-state flash drive is at or above the threshold temperature, flushing Least Recently Used cache windows and Most Recently Used cache windows to a source volume of the system.

13. A data handling system, comprising:
a controller; and
a solid-state flash drive, the solid-state flash drive being communicatively coupled with the controller,
wherein the system includes control programming for:
monitoring a temperature of a solid-state flash drive of the system;
when monitoring determines that the temperature of the solid-state flash drive is below a threshold temperature, routing inputs/outputs to an internal cache of the solid-state flash drive in accordance with an unrestricted mode;
when monitoring determines that the temperature of the solid-state flash drive is at or above the threshold temperature, preventing caching in the cache of the flash drive of inputs/outputs associated with Least Recently Used data; and
when monitoring determines that the temperature of the solid-state flash drive is at or above the threshold temperature, preventing caching in the cache of the flash drive of at least a portion of inputs/outputs associated with Most Recently Used data.

14. The data handling system as claimed in claim 13, wherein the system further includes control programming for:
caching middle path inputs/outputs in the cache while preventing caching of inputs/outputs associated with Least Recently Used data and
caching middle path inputs/outputs in the cache while preventing caching of inputs/outputs associated with Most Recently Used data.

15. The data handling system as claimed in claim 13, wherein the system further includes control programming for:
preventing caching in the cache of the solid-state flash drive of one or more inputs/outputs associated with Most Recently Used data based upon rate criteria associated with the one or more inputs/outputs.

16. The data handling system as claimed in claim 13, wherein the system further includes control programming for:
allowing one or more inputs/outputs associated with Most Recently Used data to be cached in the cache of the solid-state flash drive based upon rate criteria associated with the one or more inputs/outputs.

17. The data handling system as claimed in claim 16, wherein the rate criteria include one of: read rates and write rates.

18. The data handling system as claimed in claim 13, wherein the system further includes control programming for:
when monitoring determines that the temperature of the solid-state flash drive is at or above the threshold temperature, flushing Least Recently Used cache windows and Most Recently Used cache windows to a source volume of the system.

19. The data handling system as claimed in claim 13, wherein the controller is a disk array controller.

20. The data handling system as claimed in claim 19, wherein the controller is a Redundant Array of Independent Disks Serial Attached Small Computer System Interface controller.

* * * * *